US012585035B2

(12) United States Patent
Yano et al.

(10) Patent No.: US 12,585,035 B2
(45) Date of Patent: Mar. 24, 2026

(54) RADIATION IMAGE PHOTOGRAPHING APPARATUS

(71) Applicant: Konica Minolta, Inc., Tokyo (JP)

(72) Inventors: Yuuri Yano, Kokubunji (JP); Junichiro Otaki, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 223 days.

(21) Appl. No.: 18/479,940

(22) Filed: Oct. 3, 2023

(65) Prior Publication Data

US 2024/0118438 A1     Apr. 11, 2024

(30) Foreign Application Priority Data

Oct. 6, 2022     (JP) ................................. 2022-161411

(51) Int. Cl.
    *G01T 1/24*          (2006.01)
(52) U.S. Cl.
    CPC .............. *G01T 1/244* (2013.01); *G01T 1/247* (2013.01)

(58) Field of Classification Search
    CPC ...................................................... G01T 1/244
    See application file for complete search history.

(56) References Cited

U.S. PATENT DOCUMENTS

| | | | | |
|---|---|---|---|---|
| 7,745,797 B1 * | 6/2010 | Liu | ........................... | G01T 1/00 |
| | | | | 250/370.09 |
| 2017/0299735 A1 * | 10/2017 | MacLaughlin | ........... | G01T 7/00 |

FOREIGN PATENT DOCUMENTS

JP          2021169964 A      10/2021

* cited by examiner

*Primary Examiner* — Carolyn Fin
(74) *Attorney, Agent, or Firm* — CANTOR COLBURN LLP

(57)          ABSTRACT

A radiation image photographing apparatus including: a base material that is made of a charged material, a radiation sensor that is provided on the side of a first surface of the base material and detects radiation, a housing that houses the base material and the radiation sensor, and an antistatic member that is provided between the housing and a second surface on the opposite side of the first surface of the base material.

8 Claims, 7 Drawing Sheets

RADIATION IMAGE PHOTOGRAPHING APPARATUS

CROSS-REFERENCE TO RELATED APPLICATIONS

The present invention claims priority under 35 U.S.C. § 119 to Japanese Patent Application No. 2022-161411 filed on Oct. 6, 2022, the entire content of which is incorporated herein by reference.

TECHNICAL FIELD

The present disclosure relates to a radiation image photographing apparatus.

DESCRIPTION OF THE RELATED ART

In recent years, a portable (also referred to as a cassette-type or the like) radiation image photographing apparatus that can be separated and carried from an imaging table has been developed and put into practical use. Such a radiation image photographing apparatus is sometimes referred to as an FPD (Flat Panel Detector because it is panel-shaped. An FPD includes a radiation sensor for detecting radiation, a base material for supporting the radiation sensor, and the like.

For example, JP 2021-169964 A describes a radiation detector including a radiation sensor having flexibility and a support member (base material) made of foam.

SUMMARY OF THE INVENTION

When an FPD is used in the healthcare field, contact-charging, peeling-charging, or the like occurs between the base material and a housing of the radiation image photographing apparatus due to compression by a patient under examination, moving of a bed, vibrations caused by movement of the patient, or the like. As a result, noise caused by the charging phenomenon may occur. Such noise causes unevenness in the captured image.

Further, in the imaging method in which an FPD and a radiation emitting apparatus are not interlocked with each other, and detection that radiation has been emitted is made by using a part of an output signal of the FPD, there is a possibility that detection that radiation has been emitted is erroneously made due to the noise even though radiation is not emitted.

However, JP-A-2021-169964 does not consider preventing the above-mentioned charging phenomenon, and thus the above-mentioned problem is not solved.

The present disclosure has been made in view of the above problems, and an object of the present disclosure is to provide a radiation image photographing apparatus capable of suppressing an effect of the base material charging.

To achieve at least one of the abovementioned objects, according to an aspect of the present invention, a radiation image photographing apparatus reflecting one aspect of the present invention includes:

a base material that is made of a charged material, a radiation sensor that is provided on the side of a first surface of the base material and detects radiation, a housing that houses the base material and the radiation sensor, and an antistatic member that is provided between the housing and a second surface on the opposite side of the first surface of the base material.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 1 is a perspective view when looking at a part of the front and side surfaces of a radiation image photographing apparatus according to an embodiment of the present invention.

FIG. 2 is a schematic view of a cross-section of the radiation image photographing apparatus of FIG. 1 along II-II line.

DETAILED DESCRIPTION

Figure 3:
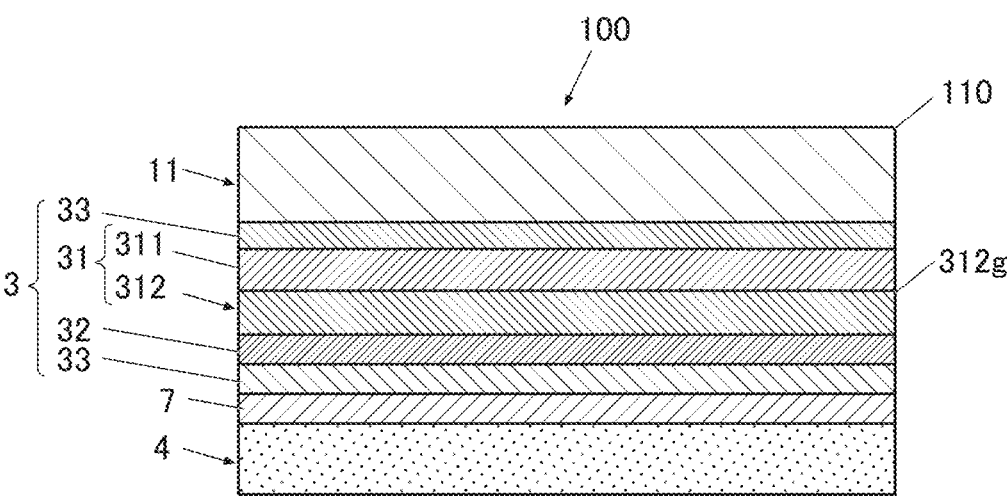
FIG. 3 is a partial cross-sectional view III of FIG. 2.

Hereinafter, one or more embodiments of the present invention will be described with reference to the drawings. However, the scope of the invention is not limited to the disclosed embodiments.

First, a schematic configuration of a radiation image photographing apparatus 100 according to the present embodiment will be described.

The radiation image photographing apparatus 100 generates radiation images corresponding to the received radiation.

1. Housing

Figure 1:
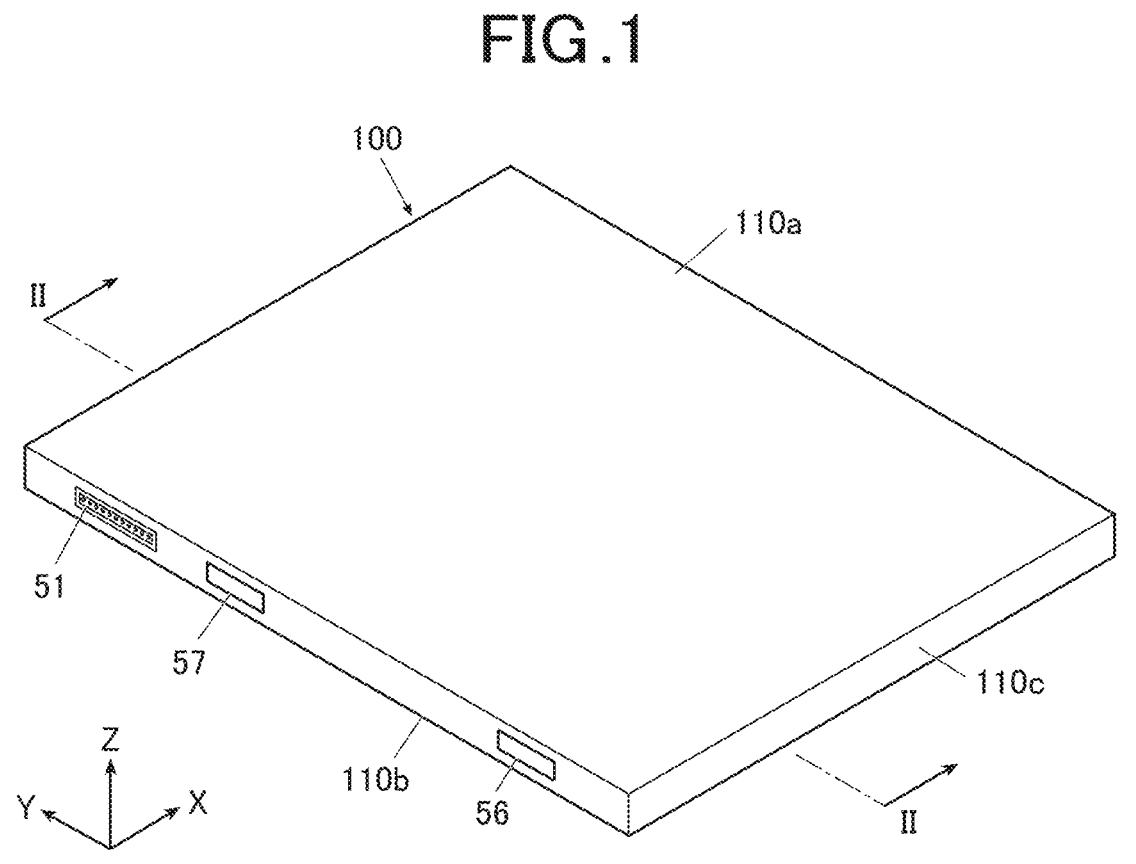

The radiation image photographing apparatus 100 includes a housing 110 that is rectangular in a plan view, and FIG. 1 is a perspective view of the housing 110 when looking at a portion of the front surface 110a and side surface 110c into which the radiation enters. A surface on the opposite side of the front surface 110a of the housing 110 is defined as a back surface 110b.

In FIG. 1, the X-axis direction is a direction parallel to a short side of the housing 110. The Y-axis direction is a direction parallel to a long side of the housing 110. The Z-axis direction is a thickness direction of the housing 110. The direction of the arrow of each axis is a positive (+) direction. That is, a direction of the side on which the connector 51, the antennae 56, and operation receiver 57, which will be described later is defined as a negative (−) direction with respect to the X-axis direction. A direction from the antenna 56 toward the connector 51 is defined as a positive (+) direction with respect to the Y-axis direction. Further, a direction from the rear 110b toward the front surface 110a is defined as a positive (+) direction with respect to the Z-axis direction.

As shown in FIG. 1, a connector 51, an antenna 56, and an operation receiver 57 are provided on a side surface 110c of the housing 110.

The connector 51 performs power supply from the outside through a wired connection or performs communication with the outside.

The antenna 56 performs wireless communication with an external device.

The operation receiver 57 is a switch such as a power switch or a changeover switch.

Figure 2:
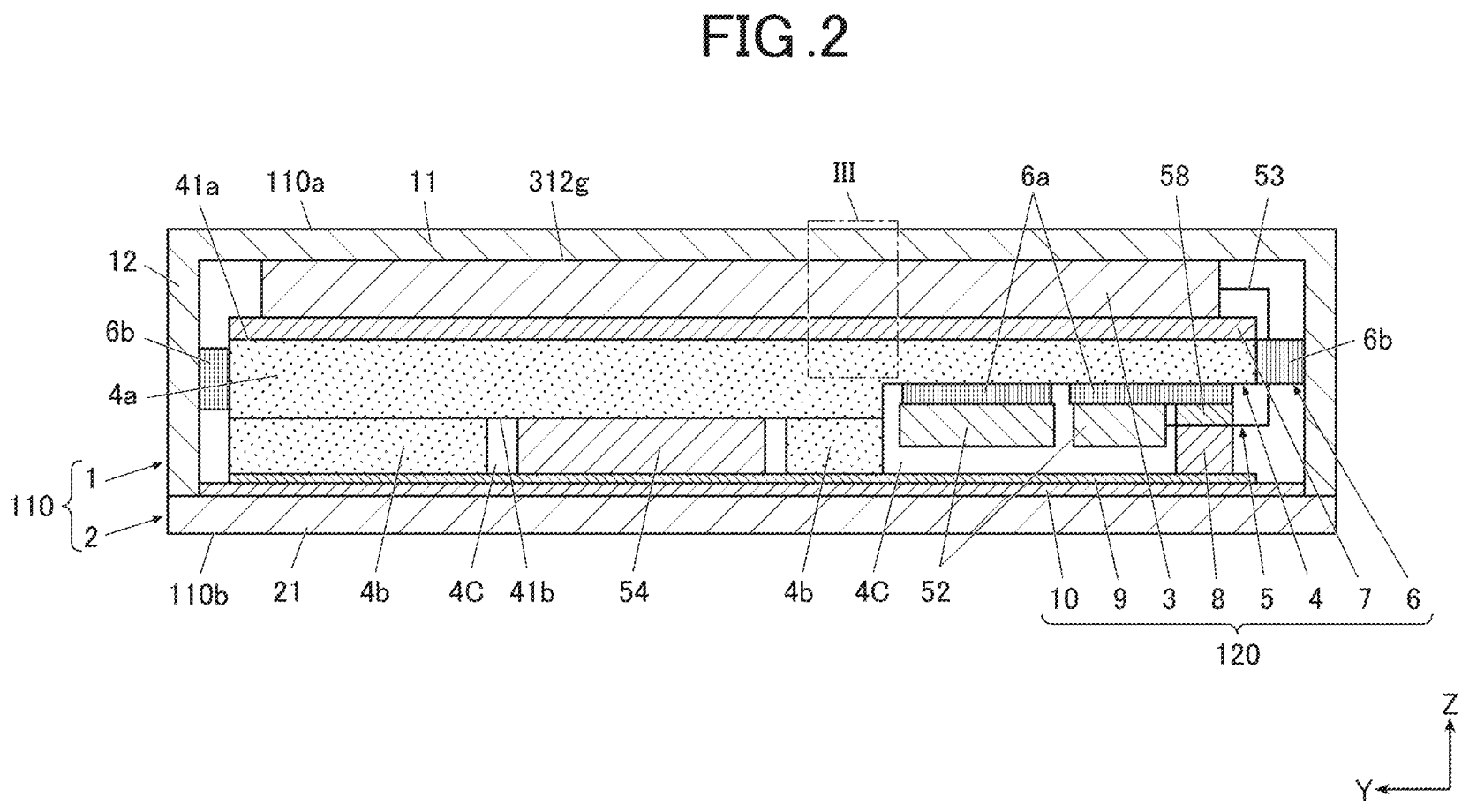

FIG. 2 is a schematic diagram of a cross-section of the radiation image photographing apparatus 100 shown in FIG. 1 along II-II.

As shown in FIG. 2, the housing 110 includes a box body 1 and a cover body 2 and has a rectangular panel-like shape.

The housing 110 also houses an internal module 120.

In addition, the housing 110 is made of a radiolucent material.

For example, the material of the housing 110 is a carbon fiber reinforced resin (Carbon Fiber Reinforced Plastic: CFRP) containing short fibers, a glass fiber reinforced resin (Glass Fiber Reinforced Plastic: GFRP), a light metal, an alloy containing a light metal, a carbon fiber reinforced thermoplastic resin (Carbon Fiber Reinforced Thermo-Plastics: CFRTP), or the like. When the material of the housing 110 is a carbon-fiber-reinforced (thermoplastic) resin or a glass-fiber-reinforced resin, it may be formed using SMC (Sheet Molding Compound) which is a material containing fibers shorter than the prepreg.

The light metal may be a metal with relatively low specific gravity such as aluminum and magnesium.

In this way, the weight of the housing 110 can be reduced while the stiffness of the housing 110 is maintained.

In particular, since the carbon fiber reinforced resin has a high radiation transmittance, the radiation transmitted through the subject reaches the internal module 120 without being attenuated in the middle. Therefore, an image quality of the radiographic image can be improved more than when the housing 110 is made of another material.

In addition, the housing 110 may have an entire surface thereof made of a material subjected to antimicrobial processing or the housing 110 itself may be made of a material subjected to antimicrobial processing.

The housing 110 may be provided with a protective member at a corner portion (at least one of the four corners of the front surface portion 11 and the four corners of the back surface portion 21 to be described later).

The material of the protective member may be a metal, but the protective member may be an elastic member (e.g., a resin, a rubber, an elastomer, etc.) since the radiation image photographing apparatus 100 according to the present embodiment is light enough to receive small impact due to collision.

At least one of a color and a shape of the at least one protective member may be different from that of the other protective members. In this way, an orientation of the radiation image photographing apparatus 100 can be easily identified by the position of the protective member that differs in at least one of a color and a shape from the other protective members.

1-1. Box Body

As shown in FIG. 2, the box body 1 includes a front surface portion 11 and a side surface portion 12.

The front surface portion 11 and the side surface portion 12 are integrally formed.

The front surface portion 11 and the side surface portion 12 may be separate members.

(1-1-1. Front Surface Portion)

The front surface portion 11 faces an imaging surface 312*g*, which will be described later, of a radiation sensor 3 and extends in parallel with the imaging surface 312*g*.

Further, the outer surface of the front surface portion 11 is a radiation incidence surface 110*a* (front surface) of the radiation image photographing apparatus 100 (the housing 110).

The front surface portion 11 is formed in a rectangular plate shape.

Further, on the radiation incidence surface 110*a*, an area of an effective image area (an area in which a plurality of semiconductor elements 312*b* (see FIG. 4) are arranged) of a sensor panel 31 (see FIG. 3) is indicated by a frame (not shown).

(1-1-2. Side Surface Portion)

The side surface portion 12 extends from a peripheral edge portion of the front surface portion 11 in a direction perpendicular to the radiation incidence surface 110*a* and in a direction (Z-axis minus direction) in which the back surface portion 21 is present.

In addition, the outer surface of the side surface portion 12 is a side surface 110*c* of the radiation image photographing apparatus 100 (the housing 110).

1-2. Cover Body

As shown in FIG. 2, the cover body 2 includes a back surface portion 21.

The cover body 2 according to the present embodiment is formed by the back surface portion 21 as a whole.

The back surface portion 21 faces the front surface portion 11 of the box body 1 with the internal module 120 interposed therebetween and extends in parallel with the front surface portion 11.

In addition, the outer surface of the back surface portion 21 serves as a back surface 110*b* of the radiation image photographing apparatus 100 (the housing 110).

In addition, the cover body 2 (back surface portion 21) abuts against the side surface portion 12 of the box body 1 and is attached to the side surface portion 12.

As a result, the side surface portion 12 connects the front surface portion 11 and the back surface portion 21.

The cover body 2 according to the present embodiment is screwed to the box body 1.

Therefore, when the radiation image photographing apparatus 100 is repaired or receives maintenance, the back surface portion 21 can be separated from the front portion 11 and the side surface portion 12 only by loosening and removing the screw. That is, a person who performs maintenance of the radiation image photographing apparatus 100 can easily access the internal module 120 housed by the front portion 11 and the side surface portion 12.

Further, a waterproof structure may be provided by interposing a packing between the cover body 2 and the box body 1, and by screwing or bonding the packing. Since moisture does not enter, it is possible to prevent the foam from absorbing water and affecting the sensor panel and the electric components.

1-3. Others

Note that, FIG. 2 illustrates that the side surface portion 12 is integrally formed with the front surface portion 11 and the housing 110 (box body 1), but in the housing 110, the side surface portion 12 may be integrally formed with the back surface portion 21, or the front surface portion 11, the side surface portion 12, and the back surface portion 21 may be separate members.

2. Internal Module

The internal module 120 is fixed to the inner surface of the front surface portion 11.

Methods of securing the internal module 120 to the housing 110 include adhesive bonding using an adhesive, adhesive bonding using an adhesive tape, fitting to a concave portion or a convex portion formed on an inner surface, engagement to an engagement portion formed on an inner surface, and the like.

By doing so, it is possible to prevent the internal module 120 from moving when receiving an impact from a direction (X-axis direction, Y-axis direction) substantially perpendicular to the side surface 110c of the radiation image photographing apparatus 100, and to prevent the internal module 120 from being damaged.

The internal module 120 may be fixed to the inner surface of the back surface portion 21 or the inner surface of the side surface portion 12.

Further, the internal module 120 may be fixed to the inner surface of the front surface portion 11 and the inner surface of the back surface portion 21, the inner surface of the front surface portion 11 and the inner surface of the side surface portion 12, and the inner surface of the inner surface of the side surface portion 12 and the inner surface of the back surface portion 21, respectively.

Further, the internal module 120 may be fixed to the inner surface of the front surface portion 11, the inner surface of the side surface portion 12, and the inner surface of the back surface portion 21, respectively.

The internal module 120 includes a radiation sensor 3, a base material 4, an electric component 5, a cushioning material 6, a shielder 7, thermal conductive material 8, an antistatic member 9 and a protective film 10.

2-1. Radiation Sensor

As shown in FIG. 2, the radiation sensor 3 is provided between the front surface portion 11 of the housing 110 and s shielder 7 via an adhesive layer (not shown).

FIG. 3 is a partial sectional view III of FIG. 2.

As shown in FIG. 3, the radiation sensor 3 includes a sensor panel 31, a radiation shielding layer 32, and an electromagnetic field shielding layer 33.

(2-1-1. Sensor Panel)

The sensor panel 31 according to the present embodiment is provided between the radiation shielding layer 32 and the electromagnetic field shielding layer 33.

The sensor panel 31 according to the present embodiment includes a wavelength converter 311 and a photoelectric converter 312.

The wavelength converter 311 converts radiation into visible light or the like.

The wavelength converter 311 according to the present embodiment is provided between the electromagnetic field shielding layers 33 and the photoelectric converter 312.

In addition, the wavelength converter 311 according to the present embodiment is arranged so as to extend parallel to the radiation incidence surface 110a of the housing 110.

The wavelength converter 311 according to the present embodiment includes a support layer (not shown) and a phosphor layer.

The support layer is made of a flexible material to have a shape of a film (a shape of a thin plate).

The flexible material may be, for example, polyethylene naphthalate, polyethylene terephthalate (PET), polycarbonate, polyimide, polyamide, polyetherimide, aramid, polysulfone, polyethersulfone, fluororesin, polytetrafluoroethylene (PTFE), or a composite material in which at least two or more of these are mixed.

In particular, polyimide, polyamide, polyetherimide, PTFE, or a composite material thereof is preferable from the viewpoint of improving thermal resistance.

In addition, the support layers according to the present embodiment are formed in a rectangular shape.

The phosphor layer is formed out of a phosphor on a surface of the support layer.

The phosphor is a substance that emits light due to its excited atoms when the substance is subjected to radiation of ionizing radiation such as $\alpha$-rays, $\gamma$-rays, or X-rays. That is, the phosphor converts the radiation into ultraviolet or visible light.

As the phosphor, for example, pillar-shaped crystals of cesium iodide (CsI) or the like can be used.

The phosphor layer according to the present embodiment is formed on the entire surface of the support layer facing the photoelectric converter 312.

That is, the wavelength converter 311 is formed in a rectangular shape.

In addition, the phosphor layer according to the present embodiment has such a thickness that the phosphor layer can be bent (elastically deformed) together with the support layer when the support layer is bent.

The wavelength converter 311 configured as described above has a flexible plate shape, and an area of the wavelength converter 311 which receives the radiation emits light with an intensity corresponding to a dose of the received radiation.

The photoelectric converter 312 converts light into an electric signal.

The photoelectric converter 312 according to the present embodiment is provided between the wavelength converter 311 and the radiation shielding layer 32.

In addition, the photoelectric converter 312 according to the present embodiment is arranged so as to extend parallel to the wavelength converter 311.

The photoelectric converter 312 is bonded to the wavelength converter 311.

Figure 4:
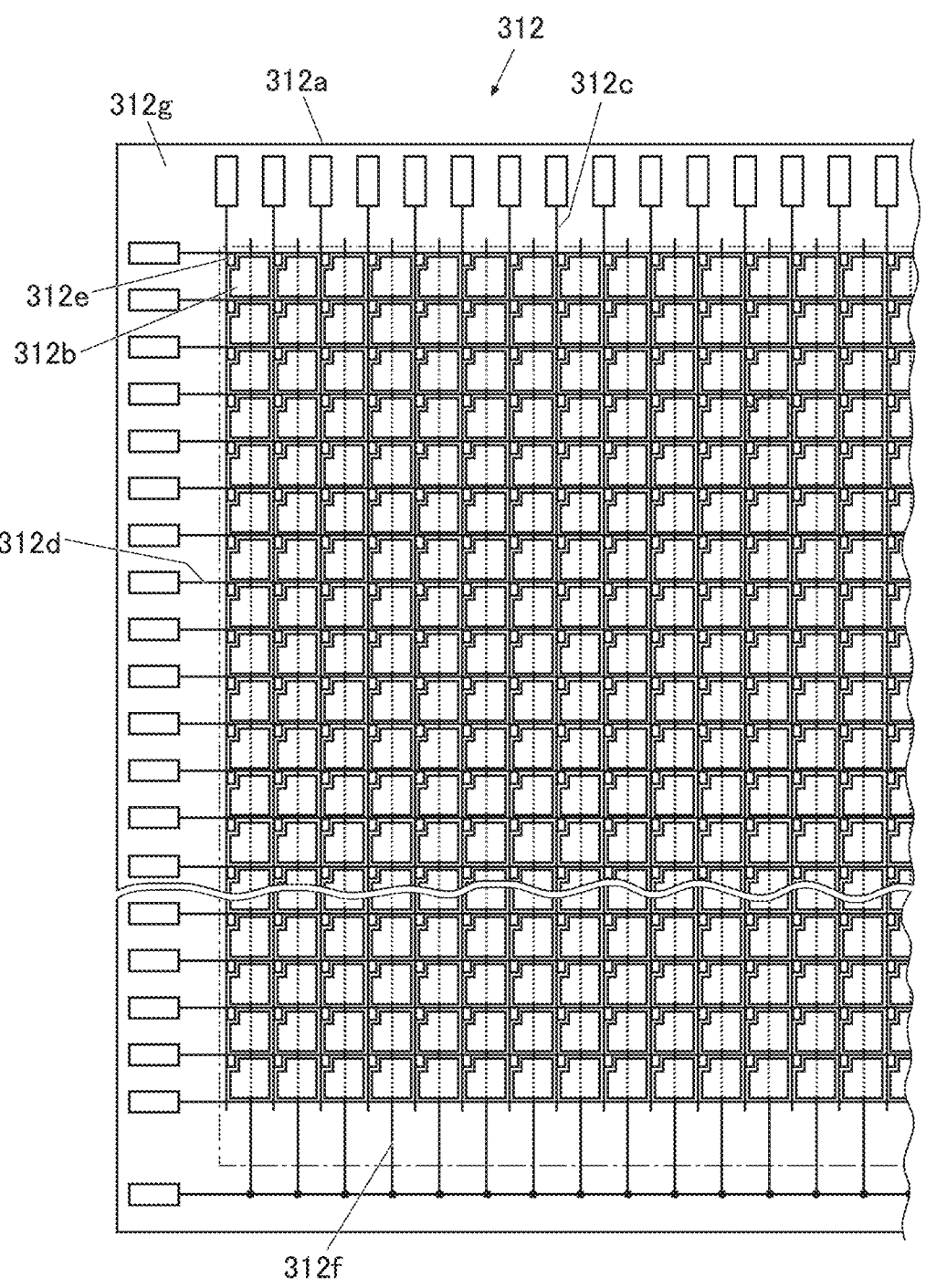
FIG. 4 is a plan view illustrating an exemplary photoelectric converter.

As illustrated in FIG. 4, the photoelectric converter 312 includes a substrate 312a, a plurality of semiconductor elements 312b, a plurality of scan lines 312c, a plurality of signal lines 312d, a plurality of switch elements 312e, and a plurality of bias lines 312f.

The substrate 312a is formed out of the above-described flexible material in a shape of a film (a shape of a thin plate).

A front view of the substrate 312a according to the present embodiment has a rectangular shape substantially equal to that of the wavelength converter 311.

The substrate 312a according to the present embodiment is made of the same material as the support layer of the wavelength converter 311.

That is, the substrate 312a according to the present embodiment has flexibility, and its thermal swell rate and its thermal shrinkage rate are equal to a thermal swell rate and a thermal shrinkage rate of the support layers.

Therefore, when the photoelectric converter 312 performs thermal swell, the wavelength converter 311 also performs thermal swell, so that a laminated body of the photoelectric converter 312 and the wavelength converter 311 is less likely to warp. As a consequence, it is possible to prevent a certain light emitting position in the wavelength converter 311 from being displaced from the semiconductor element 312*b* facing the certain light emitting position, thereby reducing the image quality of the radiographic images.

The substrate 312*a* may be formed out of a material that has a thermal swell rate and a thermal shrinkage rate which are the same as those of the support layer and that differs from a material of the support layer.

The plurality of semiconductor elements 312*b* are configured to respectively generate charges corresponding to intensities of received light.

In addition, the plurality of semiconductor elements 312*b* are formed so as to be distributed two-dimensionally on the substrate 312*a*.

Specifically, the plurality of semiconductor elements 312*b* are arranged in a matrix on a surface of the substrate 312*a* that is in contact with (bonded to) the wavelength converter 311.

The plurality of semiconductor elements 312*b* according to the present embodiment are arranged in a matrix in a central portion of the imaging surface 312*g*. Specifically, the plurality of semiconductor elements 312*b* are respectively arranged in a plurality of rectangular regions (corresponding to respective pixels of a radiographic image) on the front face of the substrate 312*a* which are surrounded by the plurality of scanning lines 312*c* formed so as to extend at equal intervals and parallel to each other and the plurality of signal lines 312*d* formed so as to be equal intervals and orthogonal to the scanning lines 312*c*.

The switching elements 312*e* are provided in the respective rectangular regions. The switch element 312*e* is made of, for example, TFT, and the gates of the switch elements 312*e* are connected to the scan lines 312*c*, the sources of the switch elements 312*e* are connected to the signal lines 312*d*, and the drains of the switch elements 312*e* are connected to the semiconductor elements 312*b*.

Hereinafter, a surface of the substrate 312*a* on which semiconductor element 312*b* is formed will be referred to as an imaging surface 312*g*.

The photoelectric converter 312 configured as described above has flexibility and is arranged such that the imaging surface 312*g* on which the semiconducting device 312*b* is formed faces the wavelength converter 311.

Further, as described above, by forming the sensor panel 31 composed of the wavelength converter 311 and the photoelectric converter 312 out of the flexible material, the sensor panel 31 is less likely to be damaged even if the radiation image photographing apparatus 100 is subjected to an impact, and the weight of the sensor panel 31 can be reduced.

(2-1-2. Radiation Shielding Layer)

The radiation shielding layer 32 prevent scattered radiation from reaching a circuit board 52.

As shown in FIG. 3, the radiation shielding layer 32 according to the present embodiment is provided between the sensor-panel 31 (the photoelectric converter 312) and the electromagnetic field shielding layer 33.

A material of the radiation shielding layer 32 is preferably a metal, particularly lead, but in recent years, tungsten, molybdenum, or the like is also used from the viewpoint of environmental protection.

In addition, the radiation shielding layer 32 according to the present embodiment fixes the sensor-panel 31 with an attachment portion (not shown).

The radiation shielding layer 32 may be provided between the radiation sensor 3 and the shielder 7.

(2-1-3. Electromagnetic Field Shielding Layer)

The electromagnetic field shielding layer 33 shields noise.

The electromagnetic field shielding layers 33 are provided on at least one of the imaging surface 312*g* of the radiation sensor 3 and a surface opposite to the imaging surface 312*g* of the radiation sensor 3.

As shown in FIG. 3, the electromagnetic field shielding layers 33 according to the present embodiment are provided on both the imaging surface 312*g* and the surface opposite to the imaging surface 312*g*.

The electromagnetic field shield layer 33 on the imaging surface 312*g* is attached to the inner surface of the front surface portion 11 by an adhesive layer (not shown), and the electromagnetic field shield layer 33 on the surface opposed to the imaging surface 312*g* is attached to the shielder 7 by an adhesive layer (not shown).

The electromagnetic field shielding layer 33 is a layered member including a conductive material in a part thereof.

The electromagnetic field shielding layer 33 according to the present embodiment may be a thin metal film, a film in which a metal layer is formed on a surface of a resin film, a film formed of a transparent conductive material (for example, indium tin oxide (ITO)), and the like.

An example of the metal include aluminum, copper, and the like.

The method of forming the metal layer may be, for example, a method of attaching a metal foil, a method of depositing a metal, and the like.

As the electromagnetic field shielding layer 33, a film such as an Arpet (registered trademark, Panac Co., Ltd.) is suitable.

One or more the electromagnetic field shielding layers 33 are provided on one surface.

If the electromagnetic field shielding layers 33 are provided on the imaging surface 312*g*, external noises entering from the side of the front portion 11 can be shielded.

On the other hand, if the electromagnetic field shielding layers 33 are provided on the other sides of the imaging surface 312*g*, the noises generated by the circuit board 52 can be shielded.

The electromagnetic field shielding layers 33 may be connected to, for example, a reference potential ground (RGND) which is a ground in a circuit of the circuit board 52 described later. In this way, the potential of the electromagnetic field shielding layer 33 is kept constant, and the shielding effect of the noise can be further enhanced.

In this case, it is preferable to interpose a metal (for example, nickel) having a small difference in ionization tendency from aluminum or copper.

The metal having a small difference in ionization tendency is interposed, for example, in a form of an intermediate member plated with the metal having the small difference in ionization tendency or a conductive tape containing the metal having the small difference in ionization tendency as a conductive filler.

If metals having a large difference in ionization tendency (e.g., aluminum and copper) come into contact with each other, electrolytic corrosion may occur, but the electrolytic corrosion can be prevented in this way.

The radiation shielding layer 32 and the electromagnetic field shielding layer 33 may be separated from the sensor panel 31 and provided as a shielder. The shielder is a laminated body having a radiation shielding layer on the side of the sensor panel 31 and an electromagnetic field shielding layer on the side of the base material 4.

In addition, the radiation shielding layer 32 may be connected to a reference potential ground (RGND) and used as a shielder.

2-2. Base Material

The base material 4 supports the radiation sensor 3.

This "supports" indicates not only supporting the radiation sensor 3 against a load received from the side of the front portion 11, but also providing the radiation sensor 3 on the base material 4.

As shown in FIG. 2, the base material 4 is provided between the shielder 7 and the back surface portion 21.

In this way, since the base material 4 distributes a load that the housing 110 receives from the outside, it is possible to prevent the radiation sensor 3 (sensor panel 31) from bending.

The base material 4 is formed out of metal, resin, and the like, but in the present embodiment, it is formed out of foam.

The internal module 120 including the base material 4 can be reduced in weight as compared with the case where the inner module is formed of a foam.

The material of the foam may be any one of polyethylene, polypropylene, polystyrene, modified polyphenylene ether, polyurethane, acrylic, and epoxy.

In general, soft resin has lower rigidity than hard resin. On the other hand, it is known that foam made of soft resin has higher rigidity as the expansion ratio is lower. Therefore, the required rigidity can be obtained by adjusting the foaming ratio at the time of manufacturing the foam.

The expansion ratio is preferably, for example, 30 times or less. In this way, the weight of the base material 4 can be reduced while obtaining the required rigidity without using a material (for example, fiber-reinforced resin or metal) having a higher rigidity than that of the foam in a part (for example, a surface layer portion) of the base material 4.

It is preferable that the base material 4 has a thermal swell rate that is substantially the same as that of the sensor panel 31.

The base material 4 may have elasticity.

The sensor panel 31 has a higher thermal swell rate than that of the conventional glass substrate. However, as described above, even if the sensor panel 31 is turned swell, it is possible to prevent the sensor panel 31 from swell and wrinkles on the sensor panel 31 because the base material 4 is also swell to the same degree or elastically deformed to absorb swell of the sensor panel 31.

As shown in FIG. 2, the base material 4 includes a planar portion 4a and a plurality of leg-shaped portions 4b.

(2-2-1. Planar Portion)

The planar portion 4a has a predetermined thickness in the Z-axis direction and is provided along the surface of the shielder 7 on the side of the back surface portion 21 without gap. In this way, since the base material 4 further distributes the load that the housing 110 receives from the outside, the deflection of the radiation sensor 3 can be further suppressed.

In the planar portion 4a, one surface is in contact with the shielder 7, and the other surface is in contact with the battery 54, the cushioning material 6, and the like.

Hereinafter, one surface of the planar portion 4a in contact with the shielder 7 is referred to as a support surface 41a.

The support surface 41a according to the present embodiment has a larger size than that of the sensor panel 31. Therefore, the planar portion 4a can support the entire sensor panel 31.

In FIG. 2, a planar portion 4a whose thickness (width in the Z-axis direction) is not uniform is illustrated, but the planar portion 4a may have a uniform thickness. In addition, the peripheral edge portion of the planar portion 4a in the direction (the X-axis direction and the Y-axis direction) along the support surface 41a may be thicker than the central portion. In this way, it is possible to further increase the rigidity against a load or an impact.

In addition, the central portion of the planar portion 4a may be thicker than the peripheral portion.

(2-2-2. Leg-Shaped Portions)

As shown in FIG. 2, the leg-shaped portions 4b are provided so as to protrude from an opposite surface 41b which is a surface on the opposite side of the support surface 41a of the planar portion 4a, toward the back surface portion 21 until it comes into contact with the back surface portion 21 via the antistatic member 9 and the protective film 10.

(2-2-3. Base Material, Etc.)

As shown in FIG. 2, the planar portion 4a and the plurality of leg-shaped portions 4b form a recess 4c.

The circuit board 52, the battery 54, and the like are accommodated in the recess 4c, respectively.

A width, a length, and a depth (width in the Z-axis direction) of the recess 4c may be any size that can accommodate the circuit board 52, the battery 54, and the like. That is, the thickness of the planar portion 4a is a thickness corresponding to the sizes (the widths in the Z-axis direction) of the circuit board 52, the battery 54, and the like accommodated in the recess 4c.

The base material 4 is integrally formed with the planar portion 4a and the leg-shaped portions 4b in a single foam.

In such cases, the recess 4c may be formed by cutting a portion to be a recess 4c, or may be formed by partial pressing, but is preferably formed by partial pressing.

The portion of the base material 4 where the recess 4c is formed is thinner (the width in the Z-axis direction is smaller) than the other portions (the leg-shaped portion 4b). However, when the recess 4c is formed by partial pressing, the foaming ratio of the recess 4c is lowered and the strength is improved. Therefore, the stiffness of the base material 4 in the recess 4c can be in the same level of that of the leg-shaped portion 4b.

The base material 4 may be manufactured by laminating a plurality of foams formed in a shape of a sheet.

2-3. Electrical Components

As shown in FIG. 1 and FIG. 2, the electric component 5 includes a connector 51, a circuit board 52, a wiring 53, a battery 54, an antenna 56, an operation receiver 57, a readout IC 58, and the like.

The connector 51 can be connected to an external connector for supplying power from an external device through a wired connection or communicating with an external device. Further, the connector 51 is connected to the circuit board 52, and outputs power and communication signals from the outside to the circuit board 52.

The antenna 56 performs wireless communication with an external device. Further, the antenna 56 is connected to the circuit board 52, and outputs a communication signal from the outside to the circuit board 52.

The operation receiver 57 is a switch such as a power switch or a changeover switch. The operation receiver 57 is connected to the circuit board 52, and outputs the inputted operating signal to the circuit board 52.

The read IC 58 converts the output signal from the radiation sensor 3 (the photoelectric converter 312) into image data.

As shown in FIG. 2, the circuit board 52 is attached by an adhesive or an adhesive tape on the opposite surface 41*b* of the planar portion 4*a* via a first cushioning material 6*a* described later. In this case, the terminals may be connected to each other by, for example, wiring in which a conductive tape or the like is used.

The circuit board 52 and the back surface portion 21 are spaced apart from each other. In this way, it is possible to prevent the load, that the housing 110 receives from the outside, from being transmitted to the circuit board 52.

The wiring 53 is formed of, for example, a flexible printed wiring board (Flexible Printed Circuits).

The wiring 53 connects the terminals of the respective signal lines (semiconductor element 312*b*) of the photoelectric converter 312, the readout IC 58, and the circuit board 52.

The ground at the read IC 58 and the circuit board 52 is the reference potential ground (RGND). When the read IC 58 converts the output signal from the radiation sensor 3 (the photoelectric converter 312) into image data, the reference potential ground (RGND) is referred to.

In addition, in the present embodiment, detection of emitted radiation is made by a circuit mounted on the circuit board 52, using a part of the output signal from the radiation sensor 3 (the photoelectric converter 312). That is, a detector (the circuit mounted on the circuit board 52) detects that the radiation has been emitted based on the output of the semiconductor element 312*b* included in the photoelectric converter 312. The detector refers to the reference potential ground (RGND) when it detects that the radiation has been emitted.

The battery 54 supplies power to each section of the radiation image photographing apparatus 100.

In the present embodiment, the battery 54 is a lithium ion capacitor, but may be a lithium ion battery or another rechargeable battery.

In addition, a plurality of batteries 54 may be provided.

2-4. Cushioning Material

As shown in FIG. 2, a cushioning material 6 includes a first cushioning material 6*a* and a second cushioning material 6*b*.

The first cushioning material 6*a* is disposed between the planar portion 4*a* and the circuit board 52 and is bond to the planar portion 4*a* and the circuit board 52 by an adhesive or an adhesive tape.

The second cushioning material 6*b* is disposed between the planar portion 4*a* and the side surface portion 12 and is bond to a side surface of the planar portion 4*a* (a surface parallel to the side surface portion 12) by an adhesive or an adhesive tape.

As the first cushioning material 6*a* and the second cushioning material 6*b*, it is preferable to use vibration-damping rubber that can suppress vibration more than porous (sponge-like) resinous material.

2-5. Shielder

The shielder 7 reduces effects of noises from the circuit board 52 or the like on the radiation sensor 3.

In XY plane, the shielder 7 has the same shape as a support surface 41*a* of the planar portion 4*a* and is provided so as to cover the entire surface of the support surface 41*a* between the radiation sensor 3 and the planar portion 4*a*.

It should be noted that the shielder 7 can suppress effects of peeling charge between the shielder 7 and the base material 4 when peeling occurs between the shielder 7 and the base material 4.

The shielder 7 is made of a metallic material or a material similar to the electromagnetic field shielding layer 33. Further, the shielder 7 may also be used as a radiation shielding layer by using, as the material of the shielder 7, metal such as lead having a large specific gravity.

The shielder 7 is connected to reference potential ground (RGND). As a result, the potential of the shielder 7 is kept constant, and the effect of shielding noises can be further enhanced.

When the base material 4 is formed out of foaming material (foam produced by a bead method) which is easily charged, unevenness is likely to occur in a photographed image due to effects of charging on the radiation sensor 3 if the base material 4 is vibrated by disturbance in a state that the base material 4 is charged. In addition, there is a possibility that erroneous detection that radiation has been emitted is made due to noises caused by the effects of charging even though the radiation is not actually emitted.

Therefore, as described above, by covering the entire surface of the support surface 41*a* with the shielder 7, it is possible to reduce the effects of charging on the radiation sensor 3, and it is possible to reduce the occurrence of unevenness in the photographed image. In addition, erroneous detection in radiation irradiation detection can be reduced.

In addition, the charging of the base material 4 may affect on the signal passing through the wiring 53 connecting the circuit board 52 and the radiation sensor 3 to cause the unevenness of the image or the erroneous detection, but at least in an area where the wiring 53 exists, the effects can be suppressed by covering the entire surface of the support surface 41*a* of the base material 4.

2-6. Thermal Conductive Material

A heat conductive material 8 dissipates heat of the readout IC 58.

The heat conductive material 8 is disposed between the wiring 53 and the back surface portion 21 at a position facing the readout IC 58 with the wiring 53 interposed therebetween.

When the read IC 58 is operated at a high speed, heat is generated. When the readout IC 58 is too hot, displacement occurs in the converted image data, resulting in unevenness of an image. In particular, such a problem is likely to occur when continuous shooting for obtaining moving images is performed.

Therefore, as described above, by thermally connecting the readout IC 58 and the back surface portion 21 with the thermal conductive material 8, heat of the readout IC 58 can be dissipated, and its temperature can be prevented from being excessively increased.

2-7. Antistatic Member

The antistatic member 9 in the present embodiment is an antistatic film or a conductive film.

As shown in FIG. 2, in XY plane, the antistatic member 9 has the same shape as the planar portion 4*a* of the base material 4 and is attached to the surface on the side of the back surface portion 21, of the leg-shaped portion 4*b* of the base material 4.

When one surface of the antistatic member 9 is an antistatic surface or a conductive surface and the other surface is not an antistatic surface or a conductive surface, the other surface is attached to the leg-shaped portion 4*b*. That is, the other surface is attached so that the antistatic surface or the conductive surface, which is one surface, faces the back surface portion 21.

As a method for attachment of the antistatic member 9, it is possible to adopt a method such as providing the antistatic member 9 itself with an adhesive agent or attaching the antistatic member 9 by using an adhesive double-sided tape.

When the antistatic member 9 is an antistatic film, the antistatic member 9 is formed by, for example, a film base material coated with surfactant or a film base material containing surfactant. In this case, a surface resistivity of the antistatic member 9 is $10^5 \sim 10^{11}$ ($\Omega/\square$)

Further, when the antistatic member 9 is a conductive film, the antistatic member 9 is formed by, for example, a film base material on which an ITO film is formed, or a film base material coated with a conductive resin. In this case, a surface resistivity of the antistatic member 9 is $10^0 \sim 10^6$ ($\Omega/\square$).

As the conductive film of the antistatic member 9, a film base material on which a metallic thin film of copper, aluminum, or the like is formed may be used. In this case, a surface resistivity of the antistatic member 9 is as low as the metal.

A material of the base material of the antistatic film or the conductive film which is the antistatic member 9 polyethylene (PE), polypropylene (PP), polyethylene terephthalate (PET), polyethylene naphthalate (PEN), polyimide (PI), or the like. In addition, it is preferable that the film base material has a thickness of 20 to 200 ($\mu$m), which makes it easy to handle.

The material and thickness of the film base material of the antistatic member 9 are preferably selected so as to be easily attached to the base material 4.

For example, when the film base material of the antistatic member 9 is made of a material having relatively higher stiffness, such as PET, the thickness is preferably 100 ($\mu$m) or less. Such a relatively thin thickness makes it possible to keep a thickness of the radiation image photographing apparatus 100 within the thickness defined in JIS. In addition, a weight of the entire the radiation image photographing apparatus 100 can be suppressed from becoming heavy.

In addition, when the antistatic member 9 is attached to the base material 4, it is preferable that the base material 4 and the antistatic member 9 are destaticized in advance so as not to confine a potential charging.

Further, the antistatic member 9 may be connected to an electrode having a constant potential (for example, a field ground connected to the housing 110) which is different from the reference potential ground (RGND) so that more charges can be diffused.

When heat generation of the read IC 58 is large, the heat conductive material 8 may be brought into contact with the back surface portion 21 without interposing the antistatic member 9 in order to dissipate the heat conductive material 8 as much as possible. That is, the antistatic member 9 may not be provided at a part where thermal conductive material 8 and the back surface portion 21 abut.

Figure 5:
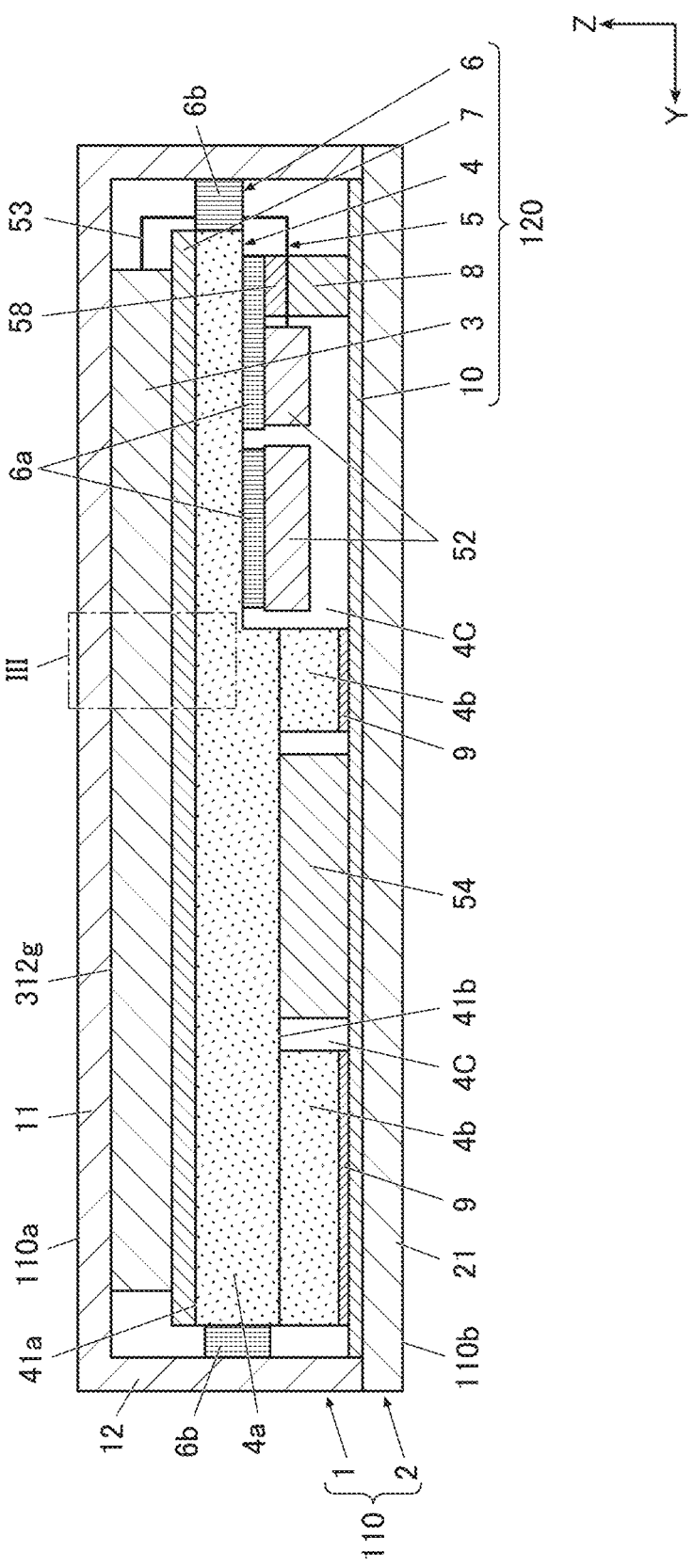
FIG. 5 is a schematic view of a cross-section of the radiation image photographing apparatus of FIG. 1 along II-II line.

As shown in FIG. 2, in XY plane, the antistatic member 9 preferably has the same shape as the planar portion 4*a* of the base material 4. However, as shown in FIG. 5, at least on the surface where the back surface portion 21 and the leg-like portion 4*b* of the base material 4 abut, the antistatic member 9 may be attached to the leg-like portion 4*b*.

In addition, the antistatic member 9 may be attached not only to the leg-shaped portion 4*b* but also to a part of the opposite surface 41*b* of the planar portion 4*a* where the leg-shaped portion 4*b* is not provided.

The following is a description of a problem that occurs when the radiation image photographing apparatus 100 does not include the antistatic member 9.

When contact charging, peeling charging or the like occurs between the leg-shaped portion 4*b* of the base material 4 and the back surface portion 21 of the housing 110, the base material 4 is rapidly charged by the charging. When a surface of the base material 4 on the side of the back surface portion 21 (a surface abutting on the back surface portion 21 of the leg-shaped portion 4*b*) is charged, a surface of the base material 4 on the side of the shielder 7 (a surface of the surface-shaped portion 4*a* abutting on the shielder 7) is also charged so as to have the opposite electric charges. This charging further causes electrostatic induction to transfer charges within the shielder 7. As a result, the reference potential ground (RGND) to which the shielder 7 is connected fluctuates, so that noise occurs in a signal which refers to the reference potential ground, causing various adverse effects.

For example, when the noise affects the output signal from the radiation sensor 3 (the photoelectric converter 312), unevenness of a radiation image or erroneous detection of radiation even though the radiation is not actually emitted.

Alternatively, if discharge occurs when the leg-like portion 4*b* of the base material 4 is peeled off from the back surface portion 21 of the housing 110, electrostatic noises are generated, or the discharge reaches a circuit mounted on the circuit board 52 through a relatively low resistance path, thereby causing an electric adverse effect.

In the present embodiment, the above mentioned problem is suppressed since the radiation image photographing apparatus 100 includes the antistatic member 9 provided between the opposite surface 41*b* of the base material 4 and the back surface portion 21 of the housing 110.

2-8. Protective Film

As shown in FIG. 2, the protective film 10 is provided on the entire surface of the back surface portion 21 in contact with a space inside the housing 110. Thus, the electrical component 5 and the like can be protected.

When heat generation of the read IC 58 is large, the heat conductive material 8 may be brought into contact with the back surface portion 21 without interposing the protective film 10 in order to dissipate the heat conductive material 8 as much as possible. That is, the protective film 10 may not be provided at a part where thermal conductive material 8 and the back surface portion 21 abut.

Polyethylene terephthalate (PET) or the like is used as a material of the protective film 10. The material of the protective film 10 is non-conductive, which makes it possible to protect the electric component 5 and the like against external electric disturbance, in particular, application of static electricity. The protective film 10 has a size which makes it possible to cover at least the circuit board 52 and other electronic components.

Note that the radiation image photographing apparatus 100 may not include the protective film 10.

<Modification 1>

Next, Modification 1 of the present invention will be described. In Modification 1, the same components as those of embodiment are denoted by the same reference numerals, and the explanation thereof is omitted.

In the radiation image photographing apparatus 100 of the present modification, instead of providing an antistatic film or a conductive film as the antistatic member 9, an antistatic agent or a conductive paint as the antistatic member 9 is applied to the base material 4.

When an antistatic agent as the antistatic member 9 is applied to the base material 4, it is preferable to apply the antistatic member 9 by, for example, fixing surfactant that is the antistatic agent to the base material 4 with a binder (chemical adhesive).

In addition, when a conductive coating material as the antistatic member 9 is applied to the base material 4, it is preferable to apply the antistatic member 9 by, for example, forming a conductive coating film on the base material 4 with the conductive coating material including fine metallic particles or conductive particles as fillers.

As the coating method, a method of spraying an antistatic agent or a conductive coating material is preferable because it can be easily applied to a surface of the leg-shaped part 4b which is in contact with the back surface part 21, and a part of the opposite surface 41b of the planar portion 4a where the leg-shaped part 4b is not provided. However, an antistatic agent or a conductive paint may be applied to the leg-shaped part 4b by a roller, a brush, or the like at least on a surface where the back surface portion 21 and the leg-shaped part 4b of the base material 4 abut each other.

<Modification 2>

Next, Modification 2 of the present invention will be described. In Modification 2, the same components as those of embodiment are denoted by the same reference numerals, and the explanation thereof is omitted.

Figure 6:
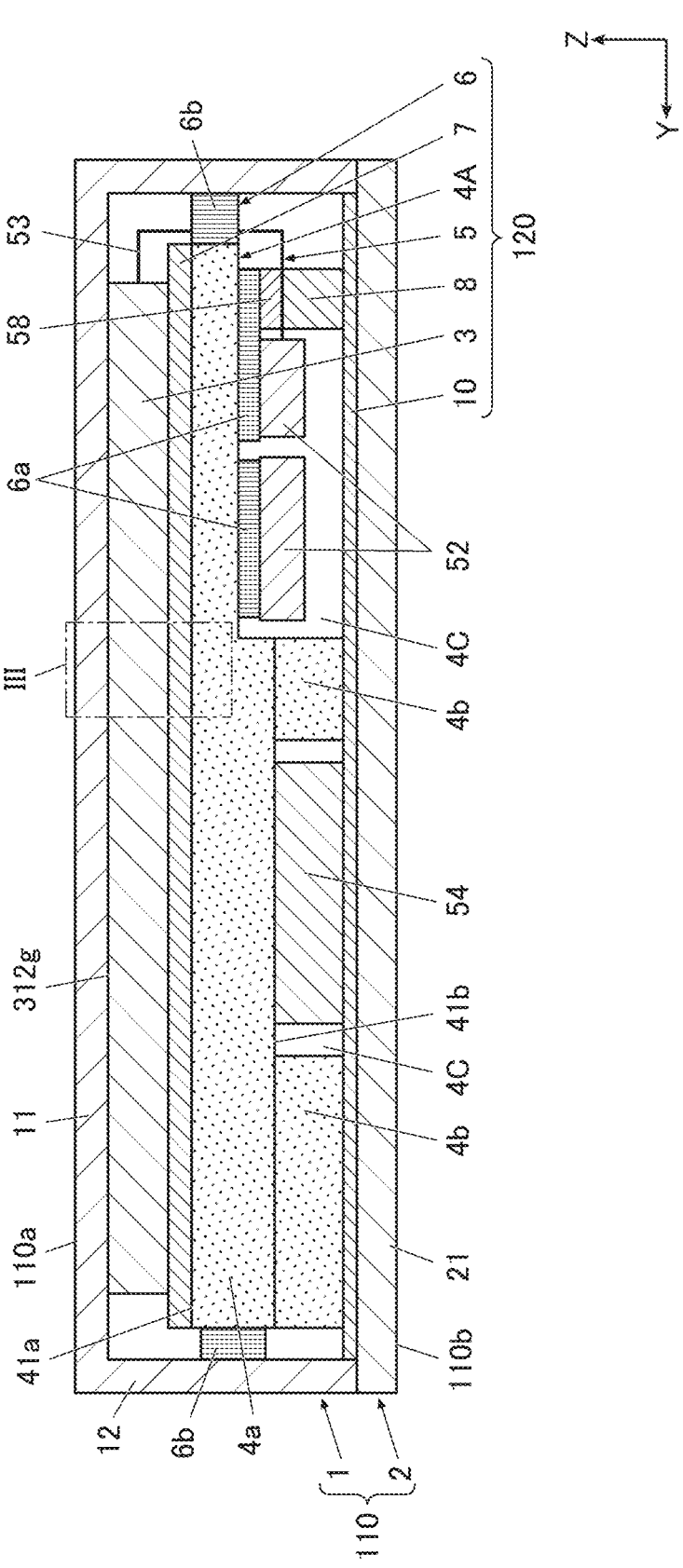
FIG. 6 is a schematic cross-sectional view of a radiation image photographing apparatus according to Variation 2.

As shown in FIG. 6, the radiation image photographing apparatus 100 of the present modification includes a base material 4A formed by including an antistatic agent instead of the antistatic member 9. As a result, the base material 4A has an antistatic function. Therefore, it is possible to prevent the base material 4A from being charged on the entire surface of the back surface portion 21. In addition, it is possible to reduce manufacturing costs such as attaching or applying the antistatic member 9 to a base material 4A.

<Modification 3>

Next, Modification 3 of the present invention will be described. In Modification 3, the same components as those of embodiment are denoted by the same reference numerals, and the explanation thereof is omitted.

Figure 7:
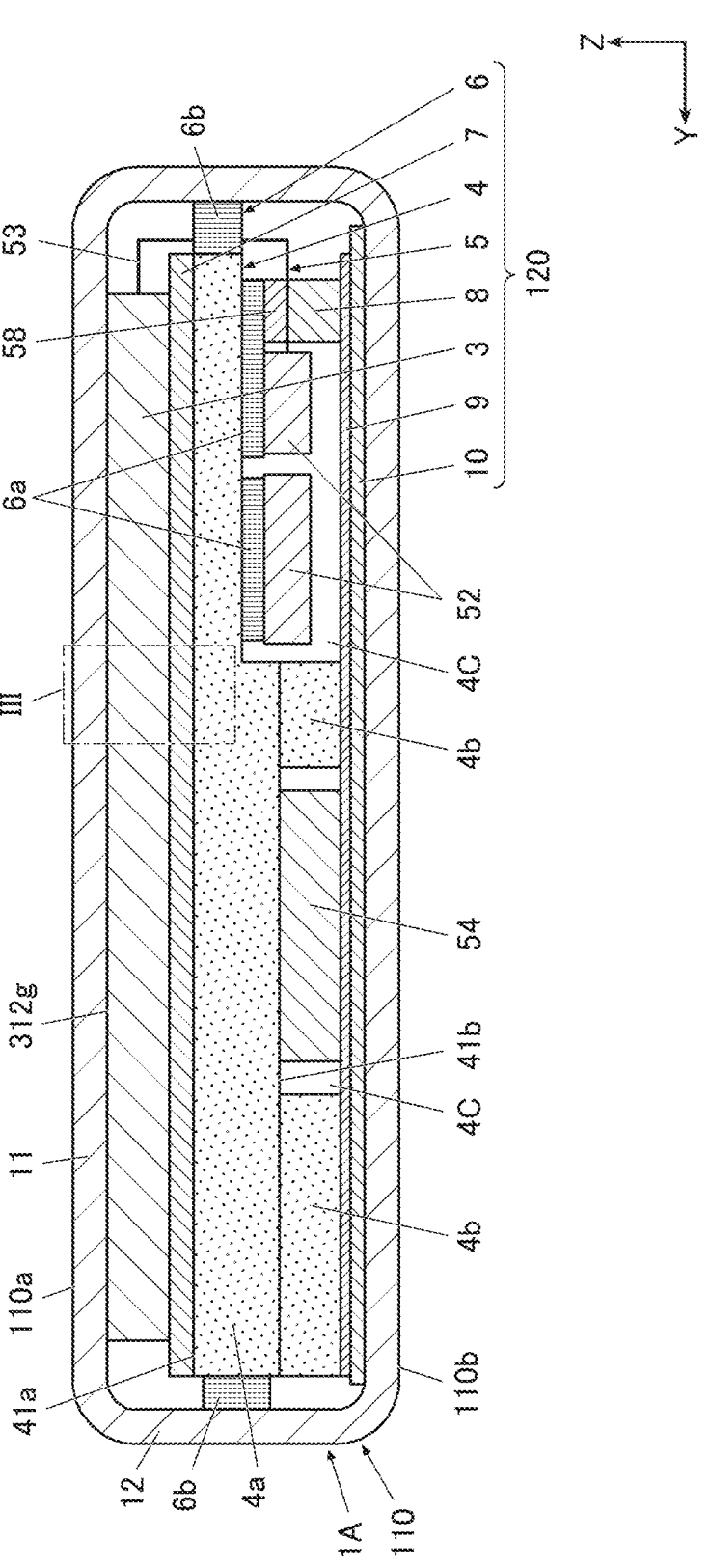
FIG. 7 is a schematic cross-sectional view of a radiation image photographing apparatus according to Variation 3.

As shown in FIG. 7, the housing 110 of the present modification includes a cylindrical body 1A having a front surface portion 11, a back surface portion 21, and a pair of side surface portions 12 connecting both ends of the front surface portion 11 and both ends of the back surface portion 21, respectively, and a cover body (not shown) for closing an open end of the cylindrical body.

This prevents the base material 4 from being triboelectrically charged when the radiation image photographing apparatus 100 is inserted during assembly.

The radiation image photographing apparatuses 100 according to the embodiment and the modifications are particularly preferably used in round visit photographing in which radiation image photographing is performed by using an outgoing round visit vehicle outside a photographing room of a hospital ward and the like. This is because a large amount of load and gripping force is applied to the radiation image photographing apparatus 100 in the round visit photographing.

3. Effects

As described above, the radiation image photographing apparatus 100 of the present embodiment includes a base material 4 that is made of a charged material, a radiation sensor that is provided on the side of a first surface (support surface 41a) of the base material 4 and detects radiation, a housing that houses the base material 4 and the radiation sensor 3, and an antistatic member 9 that is provided between the housing and a second surface (opposing surface 41b) on the opposite side of the first surface of the base material 4.

Therefore, the antistatic member 9 can suppress the charging effect of the base material 4.

In the radiation image photographing apparatus 100 of the present embodiment, the base material 4 is made of a foam material.

Therefore, the weight of the radiation image photographing apparatus 100 can be reduced.

In addition, even when the base material 4 is formed out of foamed material that is easily charged, the antistatic member 9 can suppress the charging effect of the base material 4.

In the radiation image photographing apparatus 100 of the present embodiment, the antistatic member 9 is an antistatic film or a conductive film.

Therefore, by attaching the antistatic film or the conductive film to the base material 4, the charging effect of the base material 4 can be easily suppressed.

In the radiation image photographing apparatus 100 of the present embodiment, the antistatic member 9 is an antistatic agent or a conductive coating applied to the second surface.

Therefore, by applying an antistatic agent or a conductive coating to the base material 4, the charging effect of the base material 4 can be easily suppressed.

In addition, the radiation image photographing apparatus 100 of the present embodiment further includes a shielder 7 that is provided between the base material and the radiation sensor 3, wherein the shielder 7 is grounded (connected to a reference potential ground (RGND)).

Therefore, the potential of the shielder 7 is kept constant, so that the shielding effectiveness of the noises can be further enhanced.

Further, in a configuration in which the shielder 7 is connected to the reference potential ground, it is possible to prevent noise to a signal referring to the reference potential ground, which is generated due to fluctuation of the reference potential ground caused by transfer of charges in the shielder 7 under the influence of the charging effect. As a result, it is possible to prevent the noise from affecting the output signal from the radiation sensor 3 (the photoelectric converter 312) and to prevent unevenness of a radiographic image.

In addition, embodiment's the radiation image photographing apparatus 100 includes a detector (a circuit mounted on the circuit board 52) that detects that radiation has been emitted, wherein the shielder 7 and the detector are grounded (connected to a reference potential ground (RGND)).

Therefore, the potential of the shielder 7 is kept constant, so that the shielding effectiveness of the noise can be further enhanced.

Further, in a configuration in which the shielder 7 and the detector are connected to the reference potential ground, it is possible to prevent noise to a signal referring to the reference potential ground, which is generated due to fluctuation of the reference potential ground caused by transfer of charges in the shielder 7 under the influence of the charging effect. As a result, it is possible to prevent the noise from affecting the output signal from the radiation sensor 3 (the photoelectric converter 312) and to prevent unevenness of a radiographic image and erroneous detection that irradiation is started even though the radiation is not emitted.

In the radiation image photographing apparatus 100 of the present embodiment, the radiation sensor 3 includes a substrate 312a having flexibility and a semiconductor element 312b formed on an imaging surface of the substrate 312a.

Therefore, even when the radiation image photographing apparatus 100 is subjected to an impact, a sensor panel 31 that the radiation sensor 3 includes is less likely to be damaged.

In addition, the radiation image photographing apparatus 100 of the present embodiment further includes a detector that detects that radiation has been emitted, wherein the detector makes detection based on an output of the semiconductor element 312b.

Therefore, there is no need to additionally provide an emission detector or the like as a detector.

The radiation image photographing apparatus 100 of the present embodiment further includes a protective non-conductive film 10 provided between the second surface and the housing 110.

Therefore, the electric component 5 and the like can be protected by the protective film 10.

In addition, the antistatic member 9 can prevent charging between the protective film 10 and the base material 4.

It should be noted that the present disclosure is not limited to the above-described embodiment and modifications, and various modifications can be made.

For example, in the base material 4, the planar portion 4a and the leg-shaped portion 4b are integrally formed of a single foam, but the present invention is not limited thereto. The planar portion 4a and the leg portion 4b may be formed using a foam of another material, or the planar portion 4a and the leg portion 4b may be separately formed and bonded to each other.

In addition, the specific configuration, operation contents, procedures, and the like described in the above embodiments can be appropriately changed without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A radiation image photographing apparatus comprising:
a base material that is made of a charged material,
a radiation sensor that is provided on the side of a first surface of the base material and detects radiation,
a housing that houses the base material and the radiation sensor,
an antistatic member that is provided between the housing and a second surface on the opposite side of the first surface of the base material; and
a shielder that is provided between the base material and the radiation sensor, wherein the shielder is grounded.

2. The radiation image photographing apparatus according to claim 1, wherein the base material is made of a foam material.

3. The radiation image photographing apparatus according to claim 1, wherein the antistatic member is an antistatic film or a conductive film.

4. The radiation image photographing apparatus according to claim 1, wherein the antistatic member is an antistatic agent, or a conductive coating applied to the second surface.

5. The radiation image photographing apparatus according to claim 1, further comprising a detector that detects that radiation has been emitted, wherein the shielder and the detector are grounded.

6. The radiation image photographing apparatus according to claim 1, wherein the radiation sensor includes a substrate having flexibility and a semiconductor element formed on an imaging surface of the substrate.

7. The radiation image photographing apparatus according to claim 6, further comprising a detector that detects that radiation has been emitted, wherein the detector makes detection based on an output of the semiconductor element.

8. The radiation image photographing apparatus according to claim 1, further comprising a protective film provided between the second surface and the housing.

* * * * *